United States Patent [19]

Nakajima

[11] Patent Number: 5,736,685
[45] Date of Patent: Apr. 7, 1998

[54] CONVEYOR-MOUNTED WEIGHING APPARATUS

[75] Inventor: Masayoshi Nakajima, Shiga, Japan

[73] Assignee: Ishida Co., Ltd., Kyoto, Japan

[21] Appl. No.: 554,895

[22] Filed: Nov. 9, 1995

[30] Foreign Application Priority Data

Nov. 10, 1994 [JP] Japan .................. 6-302983

[51] Int. Cl.$^6$ .......................................... G01G 19/03
[52] U.S. Cl. ................................ 177/145; 177/229
[58] Field of Search ............................ 177/119, 145, 177/50, 184, 185, 211, 229

[56] References Cited

U.S. PATENT DOCUMENTS

| | | | |
|---|---|---|---|
| 3,850,023 | 11/1974 | McDonald | 177/50 |
| 4,550,793 | 11/1985 | Giles | 177/145 |
| 4,593,778 | 6/1986 | Konishi et al. | 177/185 |
| 4,611,676 | 9/1986 | Meiring | 177/50 |
| 4,624,331 | 11/1986 | Naito | 177/185 |
| 4,751,973 | 6/1988 | Freeman et al. | 177/185 X |
| 4,926,359 | 5/1990 | Konishi et al. | 177/25.11 |
| 5,117,929 | 6/1992 | Nakamura et al. | 177/185 |
| 5,547,034 | 8/1996 | Wurz et al. | 177/25.13 |

FOREIGN PATENT DOCUMENTS 0 512 115 A1  11/1992  European Pat. Off.

*Primary Examiner*—Michael L. Gellner
*Assistant Examiner*—Randy W. Gibson
*Attorney, Agent, or Firm*—Staas & Halsey

[57] ABSTRACT

A conveyor-mounted weighing apparatus is designed to eliminate any possible influence brought about by a rotational load, generated as a result of eccentric motion of at least one roller forming a part of a conveyor unit, on a weight measurement. The conveyor-mounted weighing apparatus includes a first load detector for detecting the weight of an article to be weighed then being transported by the conveyor unit and for outputting a first load signal, a second load detector for detecting a horizontally acting load imposed on the conveyor means and for outputting a second load signal, and a calculating unit for shifting a phase of the second load signal outputted from the second load detector and subtracting the phase-shifted second load signal from the first load signal outputted from the first load detector to thereby eliminate a noise component brought about by the conveyor unit.

6 Claims, 3 Drawing Sheets

CONVEYOR-MOUNTED WEIGHING APPARATUS

BACKGROUND OF THE INVENTION 1. (Field of the Invention)

The present invention generally relates to a conveyor-mounted weighing apparatus of a type incorporated in a conveyor for weighing a load being transported by the conveyor.

2. (Description of the Prior Art)

A conveyor-mounted weighing apparatus is well known in the art. An example of the prior art conveyor-mounted weighing apparatus is shown in FIGS. 4 and 5 which illustrate the conveyor-mounted weighing apparatus in a schematic side representation and a signal processing circuit used therein, respectively. Referring first to FIG. 4, the prior art conveyor-mounted weighing apparatus includes a conveyor means 8 for transporting an article 11 to be weighed and a load cell 10 for detecting the weight of the article 11 being transported by the conveyor means 8. The conveyor means 8 includes a generally horizontally extending frame 1 mounted on a base structure 5 and having driven and drive rollers 2 and 3 rotatably mounted respective opposite ends of the frame 1, a generally endless transport belt 4 trained around the rollers 2 and 3 so as to extend therebetween, and a drive motor 6 fixedly mounted on the base structure 5 and drivingly coupled with the drive roller 3 by means of a generally endless drive belt 7 for driving the endless transport belt 4 in one direction shown by the arrow A. The load cell 10 of a generally rectangular configuration having a longitudinal axis and including a fixed rigid body and a load bearing body (movable rigid body) opposite to each other along the longitudinal axis thereof is mounted on an upright support leg structure 9 with the fixed rigid body thereof secured to the support leg structure 9 and with the load bearing body secured to the base structure 5 of the conveyor means 8 while the longitudinal axis of the load cell 10 is laid substantially horizontally, i.e., transverse to the support leg structure 9.

The prior art conveyor-mounted weighing apparatus of the structure described above operates in the following manner. The article 11 to be weighed having been delivered onto the transport belt 4 at a location adjacent the driven roller 2 is, during travel of the transport belt 4, transported in the direction shown by the arrow A, then weighed by the load cell 10 and finally ejected from the transport belt 4 at a location adjacent the drive roller 3.

The load cell 10 employed in the prior art conveyor-mounted weighing apparatus is of a type comprising a strain inducing element incorporating the Roberval's parallel motion mechanism and having a plurality of strain gauges 12 disposed on a surface thereof. As shown in FIG. 5, this load cell 10 detects the weight of the articles 11 to provide a load signal which is subsequently amplified by a pre-amplifier 13. The amplified load signal emerging from the pre-amplifier 13 is converted by an analog-to-digital (A/D) converter 14 into a digital load signal which is subsequently supplied to a low-pass filter 15 employed in the form of a digital low-pass filter operable to remove a high frequency noise component from the digital load signal. The digital load signal outputted from the low-pass filter 15 is then supplied to a zero-point adjusting means 16 where zero-point adjustment is effected to the digital load signal. The zero-point adjusting means 16 finally outputs a weight signal indicative of the weight of the article 11.

The prior art conveyor-mounted weighing apparatus of the structure described above has some problems. Specifically, since the drive and driven rollers and the drive motor are being driven to transport the article to be weighed, occurrence of an eccentric motion in one or both of the drive and driven rollers is accompanied by a rotational load which is transmitted to the load cell 10. Once this occurs, the load cell 10 outputs the load signal containing a noise component attributable to the rotational load resulting from such eccentric motion and, therefore, the weighing accuracy of the weighing apparatus as a whole tends to be reduced.

To lessen the rotational load brought about in the conveyor means, a balance adjustment for the purpose of eliminating the eccentric motion of the rollers which is considered an influential cause is carded out in the prior art conveyor-mounted weighing apparatus, but a complete balancing is difficult to achieve.

The use of a band-pass filter may be contemplated to eliminate the noise component contained in the load signal outputted from the load cell. However, since the noise component to be eliminated is a low frequency component, the response of the band-pass filter is apt to be delayed and, in addition, when the transport speed at which the article is transported by the conveyor means is modified, a filter characteristics must also be changed, resulting in complicated and time-consuming handling.

SUMMARY OF THE INVENTION

Therefore, the present invention has been devised with a view to substantially eliminating the above discussed problems and is intended to provide an improved conveyor-mounted weighing apparatus which is easy to handle and, also, which is effective to secure a high weighing accuracy by assuredly eliminating an influence brought about on the weight measurement by the rotational load occurring in the conveyor means.

In order to accomplish this object, the present invention provides a conveyor-mounted weighing apparatus which comprises a conveyor means including a plurality of rotating rollers for transporting an article to be weighed; a first load detector for detecting a weight of the article then being transported by the conveyor means and for outputting a first load signal; a second load detector for detecting a horizontally acting load imposed on the conveyor means and for outputting a second load signal; and a calculating means for shifting a phase of the second load signal from the second load detector and subtracting the phase-shifted second load signal from the first load signal from the first load detector to thereby eliminate a noise component brought about by the conveyor means. Preferably, the phase of the second load signal is shifted 90° relative to that of the first load signal.

According to the present invention, the horizontally acting load imposed on the conveyor means is detected by the second load detector which provides the second load signal. This second load signal is shifted, for example, 90° in phase relative to the phase of the first load signal outputted from the first load detector and is then subtracted from the first load signal. By so doing, the noise component incident to drive of the conveyor means, particularly the noise component attributable to the rotational load brought about by eccentric motion of at least one roller forming a part of the conveyor means, can be eliminated effectively. For this reason, any possible error in weight measurement is advantageously avoided to attain a highly accurate weight measurement. In addition, even though the transport speed exhibited by the conveyor means is changed, no adjustment work including adjustment of filters is needed which would otherwise be required, rendering the weighing apparatus as a whole to be easy to handle.

Each of said first and second load detectors has a fixed rigid body and a load bearing body. The fixed rigid body of the second load detector is preferably supported on the load bearing body of the first load detector and the conveyor means is preferably supported on the load bearing body of the second load detector. This arrangement is particularly advantageous in that a load detector unit of the conveyor-mounted weighing apparatus, including the first and second load detectors, can be assembled compact.

Again, a cell sensitivity adjusting means is preferably disposed in a stage preceding the calculating means for compensating for a difference in sensitivity between the first and second load signals. The use of the cell sensitivity adjusting means is advantageous in that, since the difference between the cell sensitivity of the first load signal and the cell sensitivity of the second load signal can be compensated for, elimination of the noise component can be achieved effectively and precisely.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Figure 1:
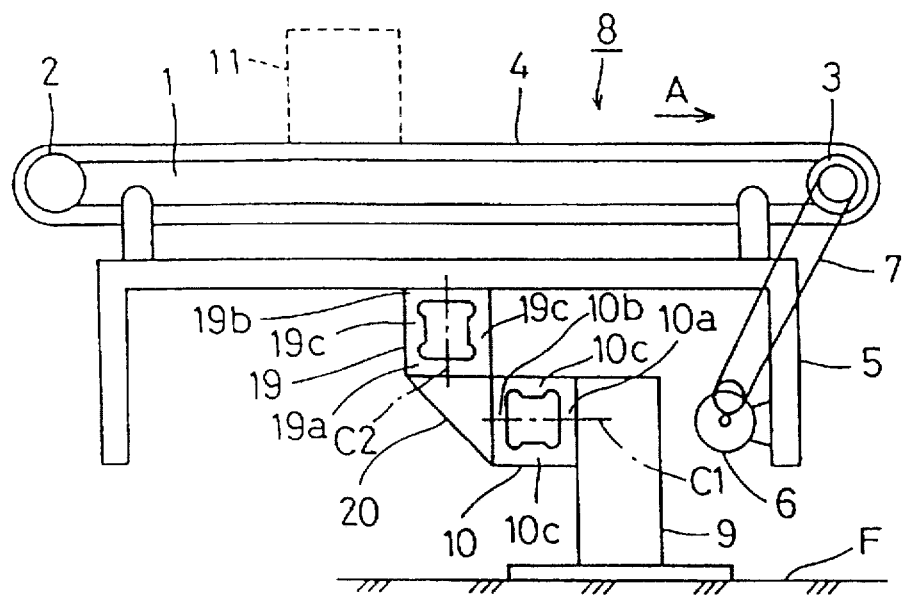
FIG. 1 is a schematic side sectional view of a conveyor-mounted weighing apparatus according to a preferred embodiment of the present invention.
Figure 4:
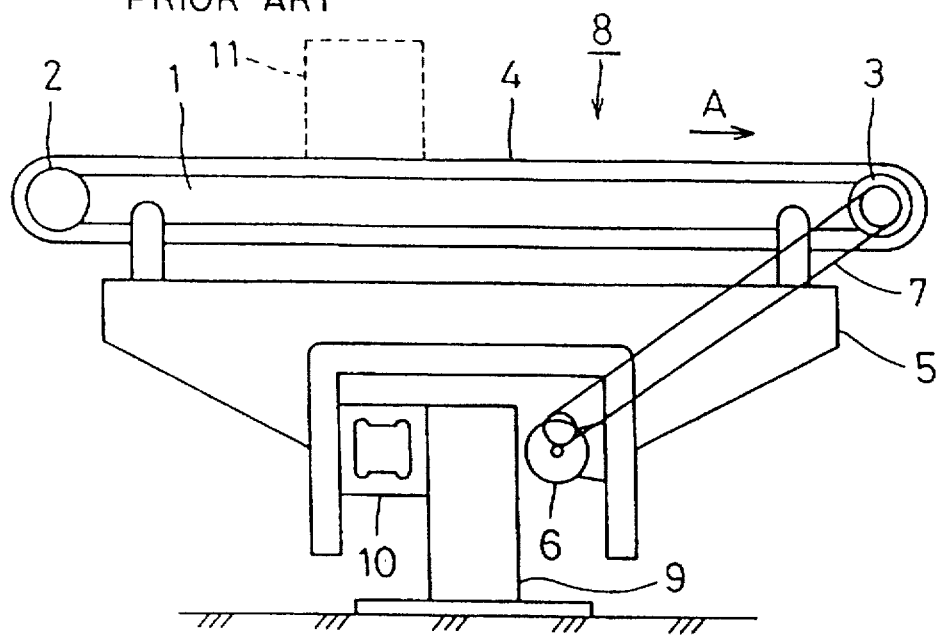
FIG. 4 is a schematic side sectional view of the prior art conveyor-mounted weighing apparatus.
Figure 5:
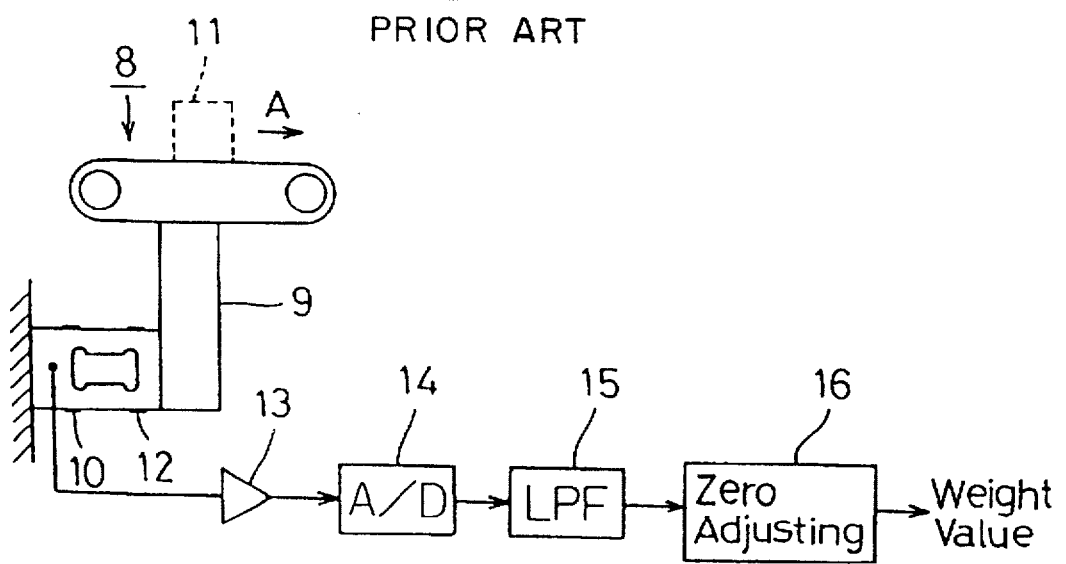
FIG. 5 is a block circuit diagram showing a signal processing circuit used in association with the prior art conveyor-mounted weighing apparatus shown in FIG. 4.

A conveyor-mounted weighing apparatus embodying the present invention is generally similar to the prior art conveyor-mounted weighing apparatus so long as like reference numerals used in FIG. 4 in connection with the prior art conveyor-mounted weighing apparatus are also employed in FIG. 1 in connection with the conveyor-mounted weighing apparatus of the present invention.

However, the conveyor-mounted weighing apparatus of the present invention makes use of two load cells (load detectors) 10 and 19 which are interposed between the base structure 5 and the support leg structure 9 in a manner which will now be described.

Referring now to FIG. 1, the first load cell 10 is comprised of a first strain inducing element of a generally rectangular configuration including a fixed rigid body 10a and a load bearing body (movable rigid body) 10b spaced from each other along a first longitudinal axis C1 of the first strain inducing element, but connected together by means of beams 10c extending parallel to the longitudinal axis C1. Similarly, the second load cell 19 is comprised of a second strain inducing element of a generally rectangular configuration including a fixed rigid body 19a and a load bearing body (movable rigid body) 19b spaced from each other along a second longitudinal axis C2 of the second strain inducing element, but connected together by means of beams 19c extending parallel to the longitudinal axis C2.

The first load cell 10 is mounted on the support leg structure 9 with the fixed rigid body 10a secured fixedly to the support leg structure 9 so as to be oriented substantially horizontally with the first longitudinal axis C1 thereof lying perpendicular to the support leg structure 9. The second load cell 19 is supported by the first load cell 10 by means of an angled coupling piece 20 having right-angled side faces coupled respectively to the load bearing body 10b of the first load cell 10 and the fixed rigid body 19a of the second load cell 19. With the second load cell 19 so supported, the second load cell 19 is oriented substantially vertically with the second longitudinal axis C2 thereof lying perpendicular to the first longitudinal axis C1 of the first load cell 10 while the load bearing body 19b thereof is coupled with the base structure 5. Thus, the load cell assembly represents a generally L-shaped configuration with the first and second load cells 10 and 19 occupying respective positions of transverse and upright arms of the shape of a figure "L".

Each of the first and second load cells 10 and 19 comprises a so-called Roberval's parallel motion mechanism which is effective to generate a strain of a magnitude proportional to a load acting thereon in a direction transverse to the first or second longitudinal axis C1 or C2 and in which generation of a strain resulting from the bending moment is suppressed. It is to be noted that the strain inducing element constituting the respective load cell may not be of the shape as shown, but may be of any suitable shape so long as each of the load cells which can be employed in the practice of the present invention comprises the Roberval's parallel motion mechanism.

Each of the first and second load cells 10 and 19 is so designed and so structured that the strain induced in the strain inducing element thereof can be detected by the strain gauges 12 and a load signal proportional to the magnitude of the strain so detected is outputted from a respective bridge circuit (not shown) including the strain gauges 12.

Of them, the first load cell 10 is operable to measure the total weight of the conveyor means 8, the second load cell 19, the angled connecting piece 20 and the article 11 to be weighed which is being transported by the endless transport belt 4. On the other hand, the second load cell 19 is operable to detect a horizontal component of the rotational load acting on the conveyor means 8.

The principle of counterbalancing the rotational load imposed by the eccentric motion of the driven and drive rollers 2 and 3, that is accomplished in accordance with the present invention, will now be discussed. Referring to FIG.

Figure 2A:
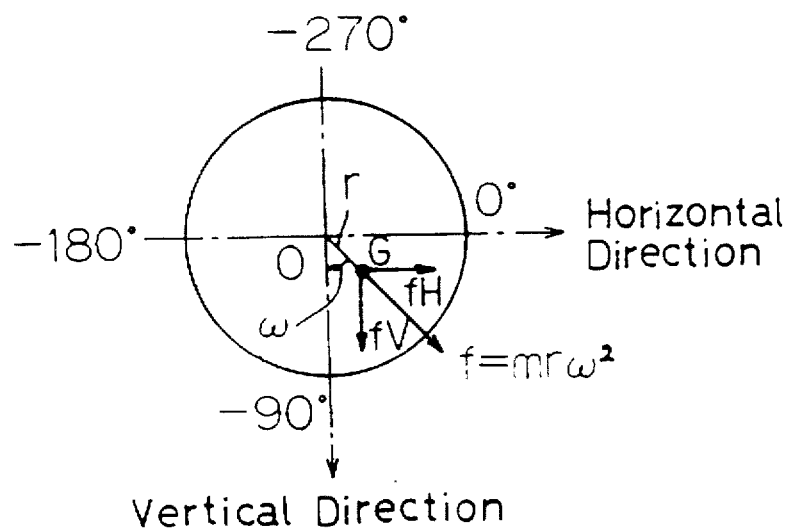
FIG. 2A is a diagram used to explain the principle of counterbalancing a rotational load imposed by an eccentric motion of driven and drive rollers of a conveyor means used in the conveyor-mounted weighing apparatus of the present invention.
Figure 2B:
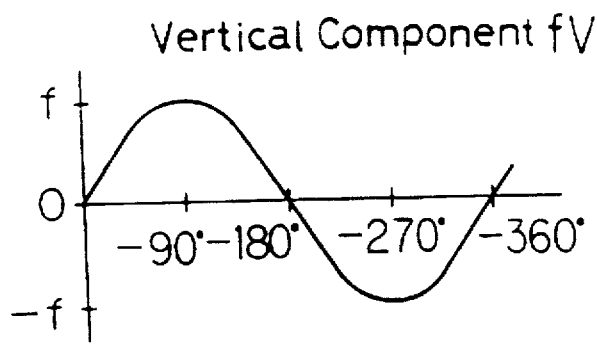
FIG. 2B is a schematic graph showing a vertical component of the rotational load acting on the conveyor means.

2A, assuming that the center of gravity of each of the driven and drive rollers 2 and 3 is displaced a quantity r from the respective longitudinal axis O thereof, a centrifugal force f, expressed by the following formula, acts on the conveyor means 8 as a rotational load:

$$f = m \cdot r \cdot \omega^2$$

wherein m represents the mass of the respective roller 2 or 3 and ω represents the angular velocity of rotation of the respective roller 2 or 3. A component of the rotational load f acting in a vertical direction, that is, a vertical component fV of the rotational load f, is represented by a signal having such a phase as shown in FIG. 2B and which is detected by the first load cell 10.

Figure 2C:
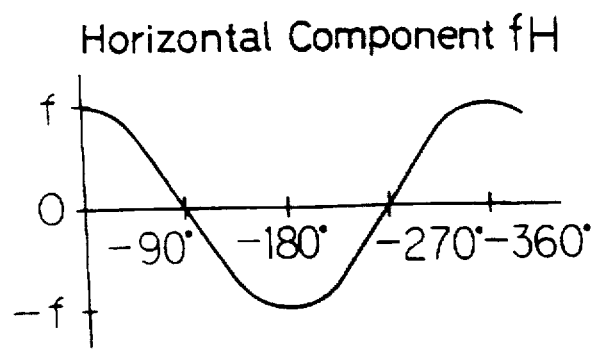
FIG. 2C is a schematic graph showing a horizontal component of the rotational load acting on the conveyor means.

On the other hand, a component of the rotational load f acting in a horizontal direction, that is, a horizontal component fH of the rotational load f, is represented by a signal having such a phase as shown in FIG. 2C and which is detected by the second load cell 19. This horizontal component fH is a signal having a phase advanced 90° relative to that of the signal representative of the vertical component fV detected by the first load cell 10. Accordingly, if a signal delayed 90° in phase from that of the vertical component fV detected by the first load cell 10 is subtracted from a first load signal w1 outputted from the first load cell 10, a noise component brought about by the rotational load of the driven and drive rollers 2 and 3 can be eliminated effectively.

It is to be noted that the difference in phase between the signal representative of the horizontal component fH and the signal representative of the vertical component fV may not be always limited to 90° such as described above, but may be of a value smaller than 90° and, even in this case, the noise component can be eliminated to some extent.

Figure 3:
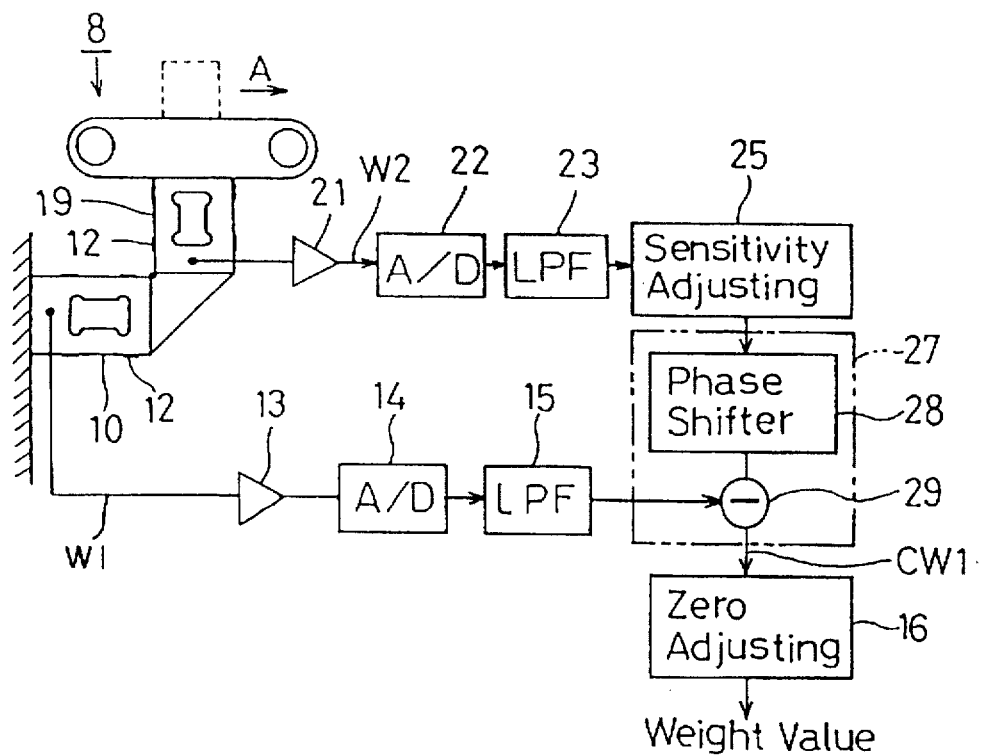
FIG. 3 is a block circuit diagram showing a signal processing circuit used in association with the conveyor-mounted weighing apparatus of the present invention.

Referring now to FIG. 3, there is shown a block circuit diagram of a signal processing circuit designed to utilize the above discussed counterbalancing principle in accordance with the present invention. The first load signal w1 outputted from the first load cell 10 is, after having been amplified by a first pre-amplifier 13, converted by a first analog-to-digital (A/D) converter 14 into a first digital load signal which is subsequently filtered through a first low-pass filter 15, employed in the form of a digital low-pass filter, to remove a high frequency noise component resulting from a mechanical vibration taking place predominantly in the conveyor means 8.

On the other hand, a second load signal w2 outputted from the second load cell 19 is, after having been amplified by a second pre-amplifier 21, converted by a second analog-to-digital (A/D) converter 22 into a second digital load signal which is subsequently supplied to a second low-pass filter 23 where a low frequency component mainly associated with the cycle of rotation of the driven and drive rollers 2 and 3 is filtered out.

The second load signal w2 having passed through the second low-pass filter 23 is supplied to a sensitivity adjusting means 25 so that a cell sensitivity can be corrected. In general, the relative magnitude of an output (a load signal) given by a load cell to a load imposed thereon, that is, the cell sensitivity, varies from one load cell to another. Accordingly, assuming that the cell sensitivities of the first and second load cells 10 and 19 are expressed by α and β, respectively, multiplication of the second load signal w2 by β/α compensates for a difference between the respective cell sensitivities of the first and second load cells 10 and 19, making it possible to equalize the level of the second load signal w2 to that of the first load signal w1 with respect to the same load. In this way, subtraction of the first and second load signals w1 and w2 as will be discussed later is accomplished accurately enough to bring about an improvement in weighing accuracy.

The second load signal w2 to which the cell sensitivity adjustment has been effected by the sensitivity adjusting means 25 in the manner described above is then supplied to a calculating means 27. This calculating means 27 includes a phase shifter 28 and a subtractor 29. The second load signal w2 supplied from the sensitivity adjusting means 25 to the phase shifter 28 is delayed 90° in phase relative to that of the first load signal w1 by the phase shifter 28 and is subsequently subtracted by the subtractor 29 from the first load signal w1. In this way, the noise component of the conveyor means 8 brought about by the rotational load of the driven and drive rollers 2 and 3 is eliminated effectively. It is to be noted that, where the orientation of a positive value of the horizontal component fH detected by the second load cell 19 is in a leftward direction which is counter to that shown in FIG. 2A (i.e., in a direction counter to the direction A of transport shown in FIG. 1), this horizontal component fH is delayed 90° in phase relative to the vertical component fV and, therefore, the phase of the horizontal component fH must be advanced 90° relative to that of the vertical component fV by the phase shifter.

The first load signal cw1 which has been corrected in the manner described above to remove the noise component of the conveyor means 8 is supplied to a zero-point adjusting means 16 where a zero-point adjustment, that is, an adjustment of the level with respect to a zero-point represented by the level of the corrected first load signal obtained when no article 11 to be weighed is placed on the endless transport belt 4, is effected to the corrected first load signal cw1. After this zero-point adjustment, a weight signal indicative of the weight of the article 11 being transported is outputted from the zero-point adjusting means 16.

As hereinbefore described, the noise component of the conveyor means 8 brought about by the eccentric motion of the driven and drive rollers 2 and 3 is effectively eliminated from the first load signal w1 corresponding to the weight of the article 11 outputted from the first load cell 10 and, therefore, the weighing accuracy of the weighing apparatus can be increased. Moreover, even though the transport speed, that is, the speed of rotation of the driven and drive rollers 2 and 3, changes in accordance with the change of type of the article 11, no adjusting work is needed which would otherwise be required to adjust components of the weighing apparatus including adjustment of the filters 15 and 23, rendering the weighing apparatus as a whole easy to handle.

Furthermore, since the fixed rigid body 19a of the second load cell 19 is mounted on the load bearing body 10b of the first load cell 10 and the conveyor means 8 is supported on the load bearing body 19b of the second load cell 19, the first and second load cells 10 and 19 are held in respective positions approaching each other and, therefore, the load cell assembly including the first and second load cells 10 and 19 can be assembled compact.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in the illustrated embodiment of the present invention the conveyor means has been shown in which the endless transport belt is driven by the rollers for transporting the articles to be weighed, any other conveyor means such as, for example, a roller conveyor comprising a plurality of juxtaposed rollers adapted to be driven to transport the article to be weighed, may be equally employed in the practice of the present invention without substantially sacrificing the effects brought about by the present invention.

Accordingly, such changes and modifications are, unless they depart from the scope of the present invention as delivered from the claims annexed hereto, to be construed as included therein.

What is claimed is:

1. A conveyor-mounted weighing apparatus which comprises:

a conveyor means including a plurality of rotating rollers for transporting an article to be weighed;

a first load detector for detecting a weight of the article to be weighed then being transported by said conveyor means by measuring a vertical load on the conveyor means and for outputting a first load signal;

a second load detector for detecting a horizontally acting load imposed on the conveyor means and for outputting a second load signal; and a calculating means for shifting a phase of the second load signal outputted from the second load detector and subtracting the phase-shifted second load signal from the first load signal outputted from the first load detector to thereby eliminate a noise component brought about the conveyor means.

2. The conveyor-mounted weighing apparatus as claimed in claim 1, wherein the phase of the second load signal is shifted 90°.

3. A conveyor-mounted weighing apparatus, comprising:

a conveyor means including a plurality of rotating rollers for transporting an article to be weighed;

a first load detector for detecting a weight of the article to be weighed then being transported by said conveyor means and for outputting a first load signal;

a second load detector for detecting a horizontally acting load imposed on the conveyor means and for outputting a second load signal; and a calculating means for shifting a phase of the second load signal outputted from the second load detector and subtracting the phase-shifted second load signal from the first load signal outputted from the first load detector to thereby eliminate a noise component brought about by the conveyor means; and wherein each of said first and second load detectors has a fixed rigid body and a load bearing body and wherein the fixed rigid body of the second load detector is supported on the load bearing body of the first load detector and said conveyor means is supported on the load bearing body of the second load detector.

4. The conveyor-mounted weighing apparatus as claimed in claim 1, further comprising a cell sensitivity adjusting means disposed in a stage preceding the calculating means for compensating for a difference in sensitivity between the first and second load signals.

5. The conveyor-mounted weighing apparatus as claimed in claim 1, wherein said calculating means includes a phase shifter for shifting the phase of the second load signal and a subtractor for subtracting an output of the phase shifter from the first load signal.

6. The conveyor-mounted weighing apparatus as claimed in claim 1, further comprising first and second amplifiers for amplifying the first and second load signals from the first and second load detectors, respectively; first and second analog-to-digital converters for converting outputs from the first and second amplifiers into first and second digital signals; fast and second low-pass filters for removing high frequency components of the first and second digital signals from the first and second analog-to-digital converters, respectively; and a cell sensitivity adjusting means for compensating for a difference in cell sensitivity between the first and second digital signals which have been filtered by the first and second low-pass filters, respectively.

* * * * *